(12) United States Patent
Knowles et al.

(10) Patent No.: US 9,701,390 B2
(45) Date of Patent: Jul. 11, 2017

(54) MODULAR INDEXING FOR AIRCRAFT INTERIOR

(71) Applicant: AEROSPACE TECHNOLOGIES GROUP, INC., Boca Raton, FL (US)

(72) Inventors: Byron R. Knowles, W. Palm Beach, FL (US); John Y. Kamin, Taylors, SC (US)

(73) Assignee: Aerospace Technologies Group, Inc., Boca Raton, FL (US)

( * ) Notice: Subject to any disclaimer, the term of this patent is extended or adjusted under 35 U.S.C. 154(b) by 104 days.

(21) Appl. No.: 14/775,090

(22) PCT Filed: Mar. 13, 2014

(86) PCT No.: PCT/US2014/026054
§ 371 (c)(1),
(2) Date: Sep. 11, 2015

(87) PCT Pub. No.: WO2014/160209
PCT Pub. Date: Oct. 2, 2014

(65) Prior Publication Data
US 2016/0023746 A1 Jan. 28, 2016

Related U.S. Application Data

(60) Provisional application No. 61/781,532, filed on Mar. 14, 2013.

(51) Int. Cl.
*B64C 1/14* (2006.01)
*B64C 1/06* (2006.01)
*B64D 11/00* (2006.01)

(52) U.S. Cl.
CPC ............... *B64C 1/14* (2013.01); *B64C 1/066* (2013.01); *B64C 1/1484* (2013.01); *B64D 11/00* (2013.01)

(58) Field of Classification Search
CPC ......... B64C 1/14; B64C 1/1484; B64C 1/066; B64D 11/00
(Continued)

(56) References Cited

U.S. PATENT DOCUMENTS 1,856,115 A 5/1932 Sallop
3,050,790 A * 8/1962 Wakefield ............. B64C 1/1484
244/129.3
(Continued)

FOREIGN PATENT DOCUMENTS

| CN | 101528491 | 9/2009 |
|---|---|---|
| EP | 0279620 | 8/1988 |
| EP | 0437870 | 7/1991 |

OTHER PUBLICATIONS

Office Action dated Jun. 28, 2016 which issued in the corresponding Chinese Patent Application No. 201480027060.0.
(Continued)

*Primary Examiner* — Justin Benedik
(74) *Attorney, Agent, or Firm* — Cozen O'Connor

(57) ABSTRACT

An assembly for an aircraft cabin of an aircraft, the aircraft having a fuselage with a plurality of external windows arranged at a pitch. The assembly having a window cone panel with an internal window, top and bottom edges defining a panel height, and side edges defining a panel width. First and second terminator components are disposed on either side of the window cone panel such that the first terminator component is on one side of the window cone panel and the second terminator component is on the other side of the window cone panel. A splice component is disposed on either side of the window cone panel between the window cone panel and one of the first and second terminator components. The splice component includes an index for adjusting an overall width of the assembly to align (Continued)

the internal window opening with the external window pitch.

13 Claims, 9 Drawing Sheets

(58) Field of Classification Search
USPC ................................ 244/129.3; 49/215, 213
See application file for complete search history.

(56) References Cited

U.S. PATENT DOCUMENTS

| | | | | |
|---|---|---|---|---|
| 3,429,530 A * | 2/1969 | Hertel | ................... | B64C 1/1484 105/396 |
| 3,585,757 A * | 6/1971 | Ritchie | ................. | B64C 1/1438 244/129.5 |
| 4,799,631 A | 1/1989 | Humphries et al. | | |
| 5,044,578 A | 9/1991 | White et al. | | |
| 5,967,595 A * | 10/1999 | Heya | ........................... | B60J 5/06 296/155 |
| 6,328,374 B1 * | 12/2001 | Patel | ........................ | B60J 5/06 296/155 |
| 6,883,755 B2 * | 4/2005 | Pautis | ................... | B64C 1/1484 244/129.3 |
| 7,118,069 B2 | 10/2006 | Novak et al. | | |
| 2003/0071172 A1 | 4/2003 | Harasta | | |
| 2003/0178531 A1 * | 9/2003 | Hopkins | ................ | B64C 1/1492 244/129.3 |
| 2004/0104306 A1 * | 6/2004 | Pautis | ................... | B64C 1/1484 244/129.3 |
| 2005/0200937 A1 * | 9/2005 | Weidner | ................ | B64C 1/1484 359/275 |
| 2006/0118676 A1 * | 6/2006 | Novak | .................... | B64C 1/066 244/129.1 |
| 2008/0266887 A1 * | 10/2008 | Wentland | ................ | B64C 1/066 362/470 |
| 2014/0117160 A1 * | 5/2014 | McCammon | ........... | B64C 1/066 244/129.3 |
| 2014/0197278 A1 * | 7/2014 | Cheung | .................. | B64C 1/066 244/131 |
| 2017/0094166 A1 * | 3/2017 | Riedel | ................. | H04N 5/23238 |

OTHER PUBLICATIONS

Supplementary Search Report dated Sep. 28, 2016 which issued in the corresponding European Patent Application No. 14775800.7.

* cited by examiner

MODULAR INDEXING FOR AIRCRAFT INTERIOR

RELATED APPLICATIONS

This is a U.S. national stage of application No. PCT/US2014/026054, filed on Mar. 13, 2014. Priority is claimed on U.S. provisional patent application Ser. No. 61/781,532 filed on Mar. 14, 2014, the entire content of which is incorporated herein by reference.

BACKGROUND OF THE INVENTION

Field of the Invention

The present invention is directed to the field of aircraft cabin design and, in particular, to providing a modular system for customizing an interior of an aircraft cabin. More particularly, the present invention is directed to a system and method of combining modular components having an indexing feature to properly align external windows of an aircraft fuselage with aircraft cabin wall panels containing window openings and window shades.

Discussion of Related Art

Passenger airplanes include a plurality of windows extending through the fuselage to allow for the entry of light into the airplane and allow passengers to see outside the airplane. These so-called external windows are spaced apart from each other by a fixed window pitch. "Window pitch" is defined as the separation between a middle point of one window to the middle point of an adjacent window. For an interior cabin of an aircraft, panels containing a window opening and a window shade which controls the amount of light entering the cabin through the opening, namely, so-called internal windows, are aligned with each external window. Thus, in commercial aircraft the window pitch of the external windows and the window pitch of the internal windows are constant and align with each other throughout the aircraft. Alternatively, the alignment occurs throughout different sections of an aircraft. For example, a business class section of a cabin may have a first window pitch to accommodate a wider seat separation between adjacent seat rows, whereas a coach class section will have a second window pitch smaller than the first window pitch due to a narrower row separation. In private aircraft, however, the interior cabins are not fixed but can be customized based on interior design specifications. Thus, for example, a bedroom of a private aircraft may have one or two internal windows aligned with external windows, followed, or separated, by a blank wall panel void of an internal window cutout or opening, whereas a conference room may have several internal windows aligned with external windows and equally spaced from each other.

In addition, in some circumstances an aircraft fuselage may be lengthened by inserting a fuselage extender panel such that the window pitch of the external windows is no longer constant between the windows directly adjacent either side of the extender panel. In such cases, an interior cabin spacer panel will be inserted to align the interior windows of the cabin with the exterior windows of the fuselage. The interior panels, therefore, regardless of whether they contain a window cutout or "cone", or a blank panel "extender", are designed to accommodate the fixed spacing of an aircraft to align the internal windows with the external fuselage windows of the aircraft.

Under current aircraft interior design techniques, each custom cabin panel—regardless of whether the panel contains an internal window cutout—is molded separately so as to align the internal cabin walls with the fuselage windows. Thus, a mold is constructed to form a panel having a particular width dimension and, thereafter, that mold would most likely not be used again. This causes significant waste in materials, time and cost. Moreover, the width dimension of the panels must be substantially exact to take into account the fixed space constraints of an aircraft cabin and provide for window alignment between internal and external aircraft windows.

SUMMARY OF THE INVENTION

In accordance with an embodiment of the invention, a window assembly for an aircraft cabin is provided. The window assembly may be comprised of two or more components consisting of a window core panel having an internal window opening, an extender panel, a splice and a terminator, to yield panels of different sizes based upon the design specifications of the cabin. Each of the components includes indexing comprised of reoccurring and equidistantly-spaced interlocking details which allow the components to be connected to each other to provide alignment of internal window openings of the cabin with external windows extending through the fuselage of the aircraft.

In one embodiment, the indexing comprises a plurality of aligned pins arranged parallel to a vertical edge of one component and a plurality of aligned holes arranged parallel along a horizontal edge of an adjacent component in which the pins are received when the components are assembled together in their intended manner. The terminator components contain guide rails in which a window shade moves, and function as an end cap at a vertical edge of the window assembly, and therefore, will contain either pins or holes only at one edge.

The components maybe manufactured by injection molding techniques as is known in the art and are attached to the aircraft structure in a known manner. Moreover, the assembled components will include one or more aircraft window shades for selectively presenting or otherwise regulating the entry of light through the window corresponding to the shade. The shade can be manually operated or electrically operated and can be customized in size based on the size of the assembled components or the design criteria of the cabin. For example, an assembled component structure having two internal windows which are aligned with two corresponding external windows may include a shade that has a double width dimension to cover both windows.

Another alternative is realized by a component assembly having a single internal window adjacent to an extender panel. Such an assembly may include a double shade, a single shade, or any other arrangement as dictated by the design of the internal cabin. These and other features are described more fully below.

DETAILED DESCRIPTION OF THE PRESENTLY PREFERRED EMBODIMENTS

Figure 1:
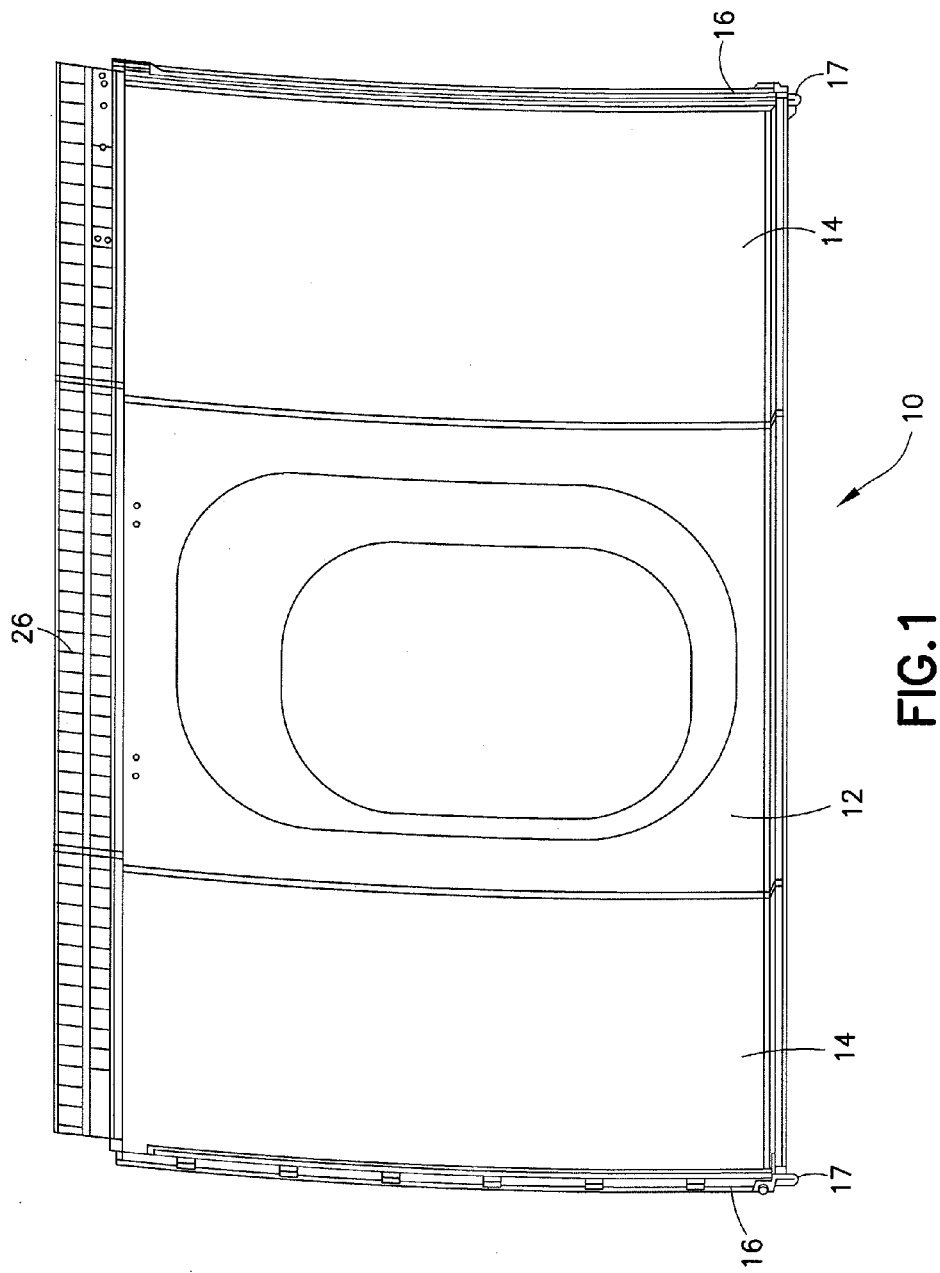
FIG. 1 shows a front view of a completed window assembly as seen from inside an aircraft cabin.
Figure 2:
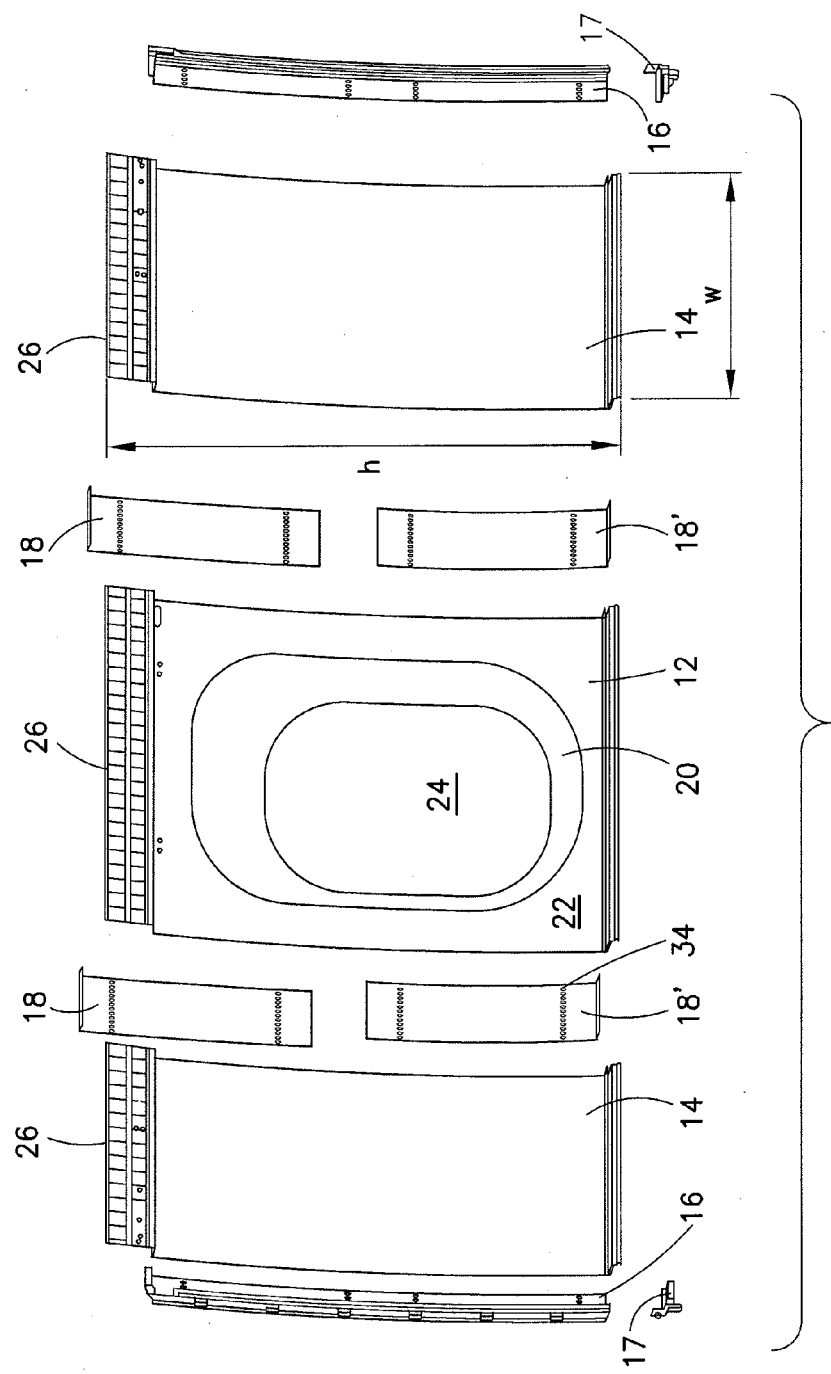
FIG. 2 shows a front view of an exploded assembly of FIG. 1.
Figure 6:
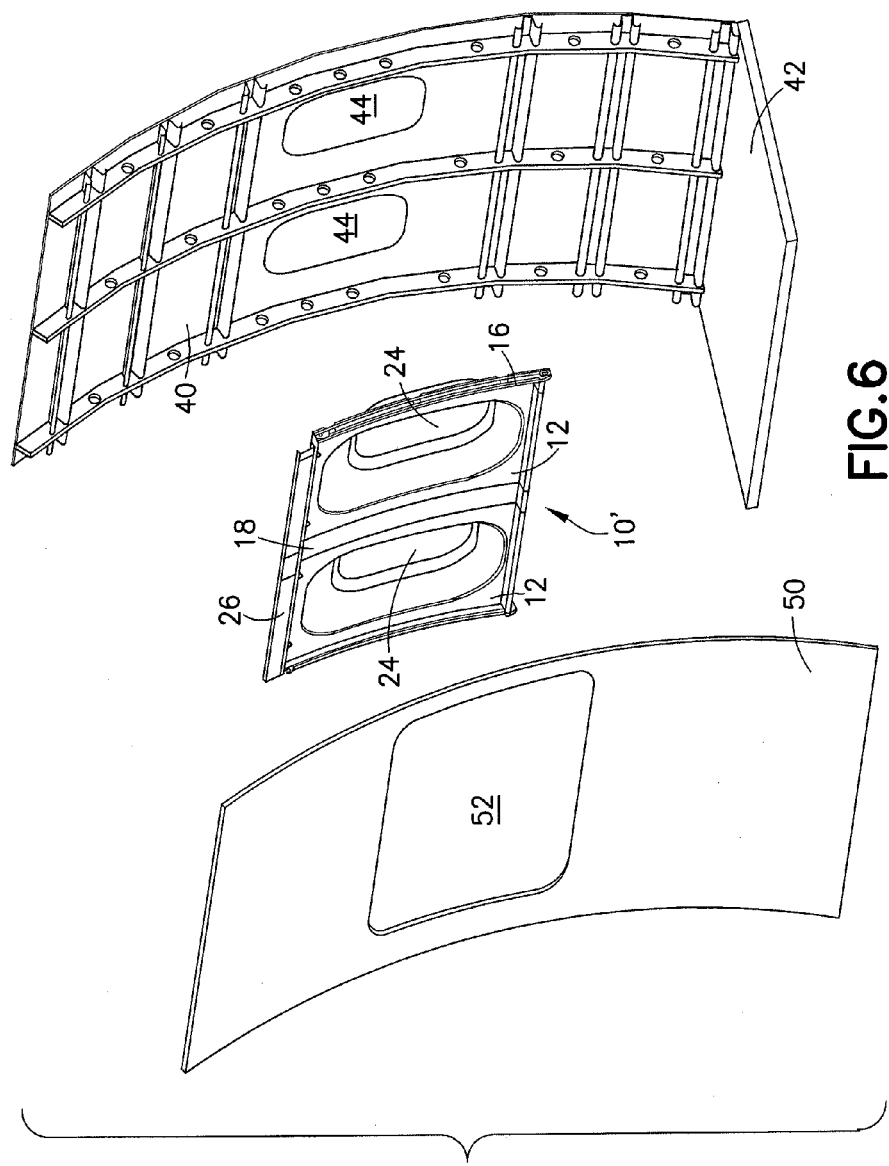
FIG. 6 shows an exploded view of a completed window assembly mounted between an aircraft structure and an overlay panel.
Figure 7:
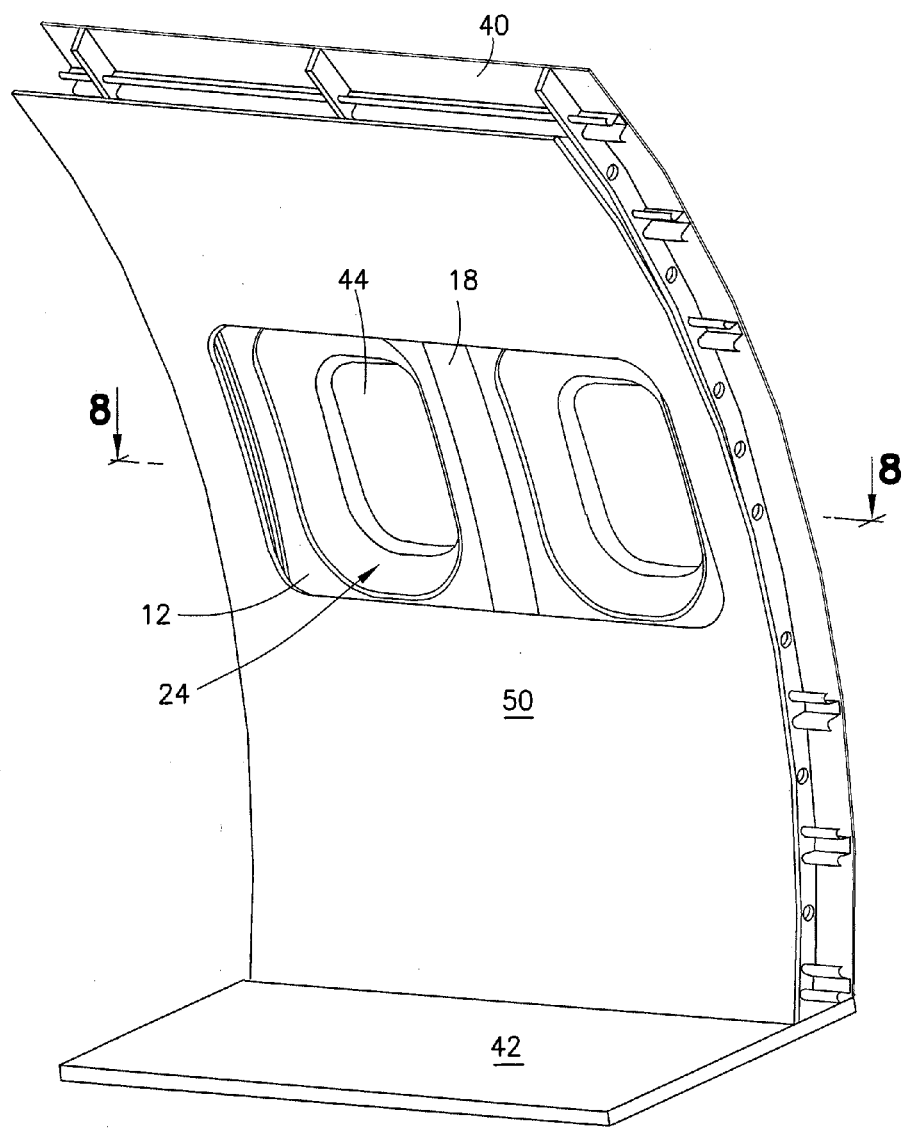
FIG. 7 shows a completed window assembly mounted to an aircraft.

With reference to FIGS. 1, 2 and 6, a window assembly 10 for mounting to a structure 40 of an aircraft, such as an airplane, is depicted. The structure 40 is comprised of panels through which external window openings 44 are formed. The window openings 44 are covered with a transparent material, as is known in the art, to maintain a desired air pressure inside a pressurized aircraft cabin while also permitting the entry into the aircraft cabin of ambient light from outside.

As shown in FIG. 2, the window assembly 10 includes a window core panel 12 having an internal window opening 24 formed therethrough for placement over and alignment with an external window opening 44. The assembly 10 also includes one or more extender panels 14, one or more splices 18 and a pair of terminator components 16; one for each side of the assembly as shown in FIG. 2. The terminator components include rails for a window shade mechanism of the type disclosed, for example, in U.S. Pat. No. 7,690,414. An anchor clip 17 is also provided at each side of the assembly to support a pulley of the window shade mechanism and to join the terminator components to the extender panels.

Figure 9:
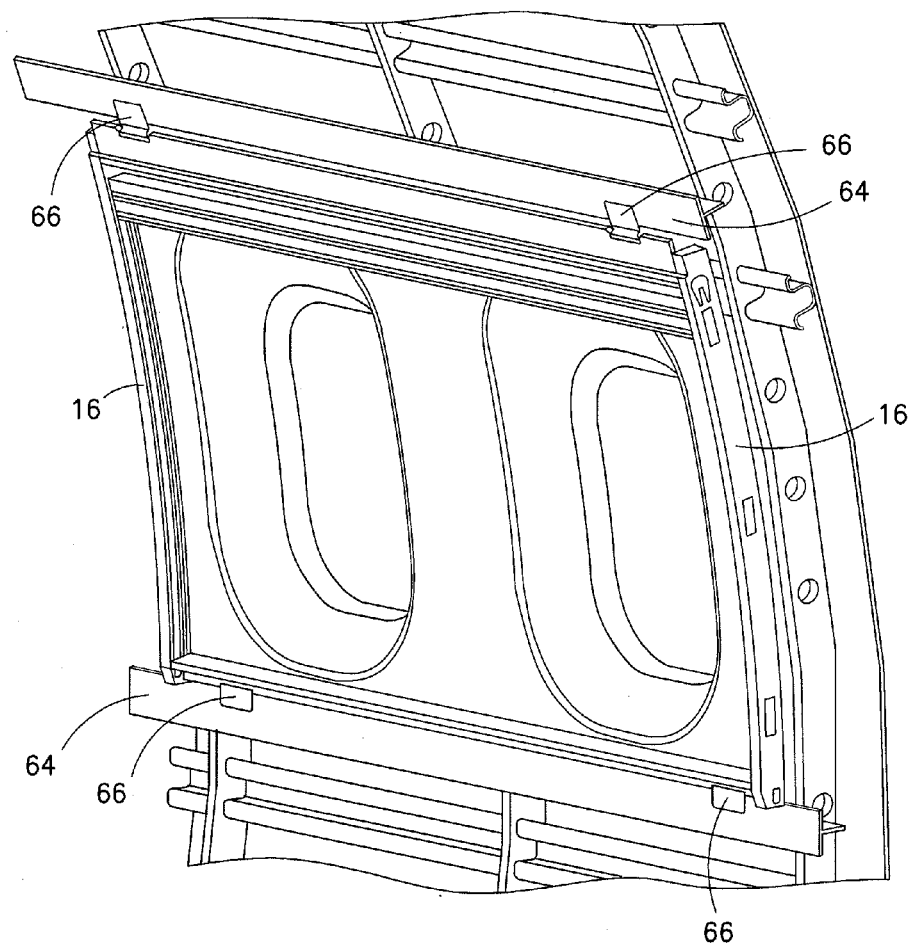
FIG. 9 shows an installed window assembly with window shade mounted to an aircraft.

The window cone panel includes a panel portion 22, a window cone 20 which surrounds the internal window opening 24, and a window shade assembly 70 (FIG. 9) which extends across the window opening 24. An extension region 26 is also provided for mounting the window cone panel to the aircraft wall section 40 such as at a T-rail 64 using mounting tabs 66 (FIG. 9) as is known in the art. As shown in the figures, each component 14, 16 and 20 has substantially same height dimension "h" which is dictated by the height requirement of the aircraft.

The splice components 18 can be manufactured as a single component having the height dimension "h" or as a double component having an upper splice 18 and a lower splice 18' which, when assembled together, substantially result in the height dimension "h". The use of upper and lower splice components provides for tolerance flexibility required by the injection molding process used to form the components. Nevertheless, single full-height splices could likewise be used.

The width dimension of the components can vary based on the type of component. For example, and as shown in FIG. 2, the width of each extender panel 14 will be one dimension, whereas the width of each window cone panel 12 may be another dimension. Likewise, the width of the splices 18 may be constant. Thus, in one embodiment, all of the splices 18 will have the same width dimension as each other, all of the window core panels will have the same width dimension as each other, and so on. Alternatively, several sizes of splices, window core panels 12 and extender panels 14 may be produced such that, when certain ones of those components are joined together, window assemblies 10 of various overall width dimensions can be realized to accommodate the varying design considerations of aircraft cabins, particularly in the private airplane industry.

The window assembly depicted in FIGS. 1-4 is a three panel assembly that may be used, for example, to occupy the space of three adjacent external windows with a single internal window. Accordingly, the assembly 10 includes a single window cone panel having an extender panel 14 on each side. In this embodiment, the window opening 24 of the window cone panel 12 must be aligned with a corresponding specified external window, whereas external windows on either side of the specified external window will be covered by the extender panels 14. It should be realized however, that the assembly 10 depicted in FIGS. 1-4 is merely an example and that other configurations can be readily realized, such as a single internal window on a left or right side of the window assembly joined to two extender panels, a double window with a central extender panel, or any other configuration as will be readily realized by those of ordinary skill in the art.

With continued reference to the assembly 10 depicted in FIGS. 1-4, left side and right side terminator components 16 and anchor clips 17 are attached to the open sides of the extender panels, i.e., the sides that are not adjacent to the window cone panel 12, to complete the window assembly 10. The terminator components will include tracks for shade assemblies as is known in the art such that a single shade assembly will extend between the two terminator components.

To provide for pitch alignment between the external and internal windows, the splices 18 are included between one or both sides of the window cone panel and an adjacent side of an extender panel 14. In FIGS. 1-4, splice components 18 are provided on each side of the window cone panel 12 between a side of the window cone panel and an adjacent side of an extender panel 14. The splice components 18 are used to incrementally increase an overall width dimension of the window assembly 10 as explained more fully below.

In accordance with a preferred embodiment, the various components of the window assembly are produced by known injection molding techniques. Select sizes of the various window assembly components will be manufactured and those components can then be combined to produce a variety of window assemblies having varying widths. For example, extender panels 14, terminator components 16, splices 18 and anchor clips 17 having right-side and left-side configurations to connect to corresponding sides of extender panels and window cone panels may be maintained in inventory and then assembled, as dictated by design specifications of an interior of an aircraft cabin. In this manner, separate molds need not be created to produce window assemblies of varying sizes. Rather, only a certain number of molds are needed to produce an inventory of so-called building blocks, e.g., components of several widths which can then be assembled to produce window assemblies of various sizes, thereby allowing for a variety of aircraft cabin window customization possibilities while reducing manufacturing costs and waste associated with prior art manufacturing techniques.

As explained above, the position and pitch of the external aircraft windows are fixed because those windows are formed in the fuselage walls of the aircraft. However, the placement of the internal windows of an aircraft cabin, especially in the private airplane industry, can be varied to accommodate various internal cabin design choices. As such, the internal windows of a window assembly 10 must be aligned with the external windows 44 in the airplane fuselage. This is accomplished by providing an index or indexing 30, which terms are used interchangeably herein, and which is depicted in region X in FIGS. 3 and 5.

Figure 3:
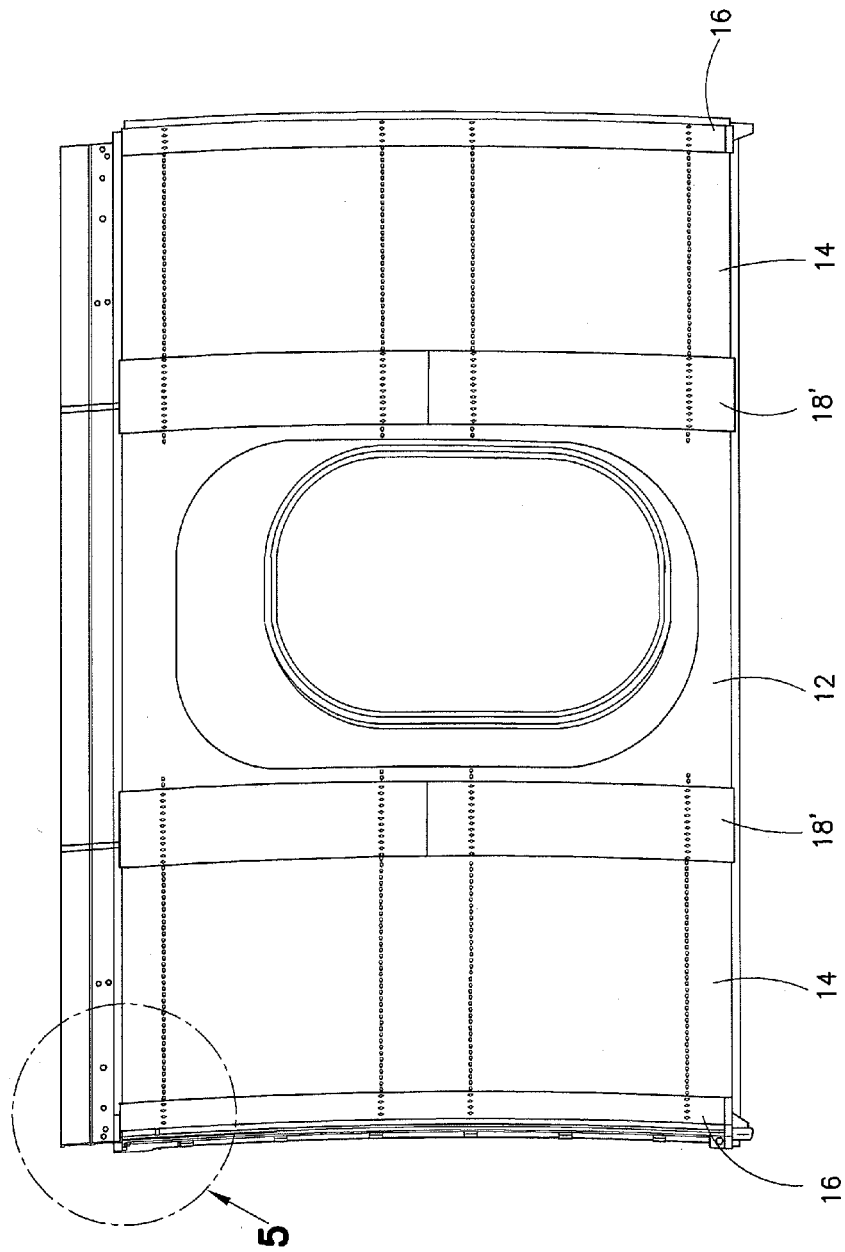
FIG. 3 shows a back view of the completed assembly of FIG. 1.
Figure 4:
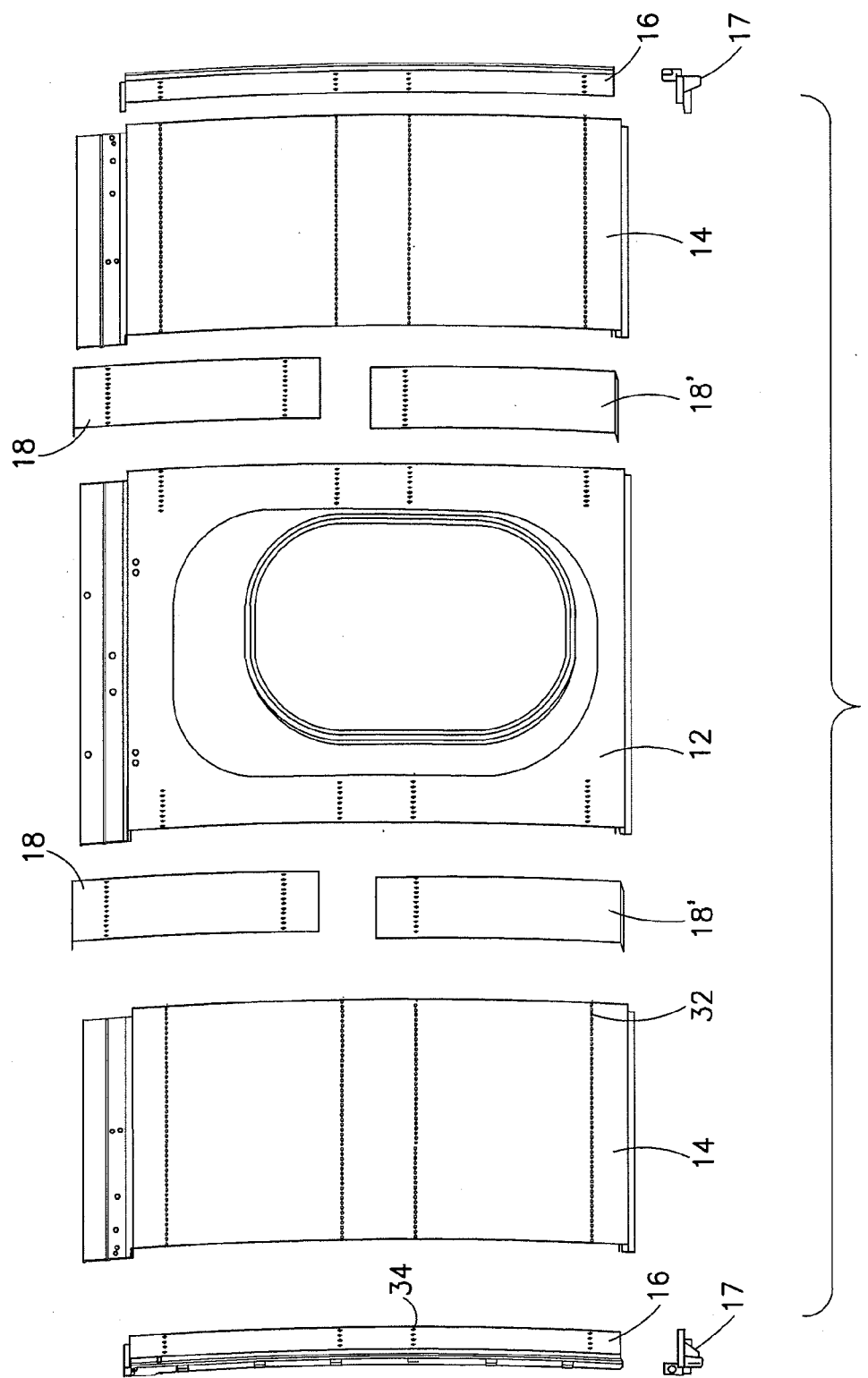
FIG. 4 shows a back view of an exploded assembly of FIG. 1.
Figure 5:
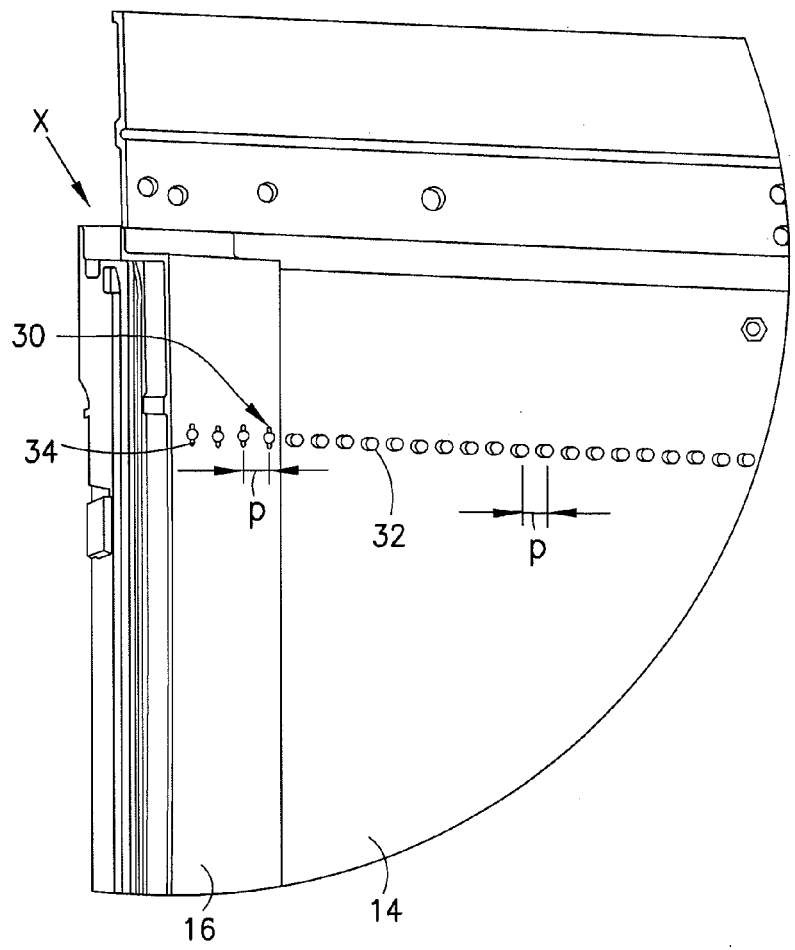
FIG. 5 shows a close-up view of an indexing feature in accordance with an embodiment of the invention.

The indexing feature 30 includes a plurality of protruding pins 32 extending from a back surface of the window assembly components. In FIG. 5, the pins 32 are shown on the back surface of the extender panel 14 and extend in a row parallel to an upper edge of the extender panel. Similar pins are arranged in horizontal, parallel rows proximate middle and bottom edges of the extender panels 14 and window cone panel 12 as shown in FIGS. 3 and 4. A plurality of holes arranged in horizontal rows in the splice components 18 and terminators 16 are positioned in locations corresponding to the positions of the pins 32. The holes are dimensioned for receiving the pins 32 to maintain the components in desired spacing relative to each other. As shown in FIG. 5, the holes in each row and the pins in each row are equally spaced from each other to define the same index pitch "p". This allows the position of the internal window to be incrementally adjusted according to the pitch of the holes/pins with respect to the external window. The pins are preferably constructed of molded plastic from the same material used to form the extender panel 14 and the other components, namely, the splice 18, panel portion 22 of the window cone panel 12, and terminators 16.

As shown in FIG. 5, the terminator includes a row of four holes 34 in which four pins are seated. However, if a larger overall width of the extender panel 14 and terminator 16 is desired to properly align internal window opening 24 with an external window, fewer pins will be used to mate with fewer holes. Thus, for example, three, two or even one pin may be used to mate with a corresponding number of holes in an adjacent component. Likewise, one or more of the mating of pins on an opposite side of panel 14, i.e. the right side of the left panel 14 in FIG. 2, will be used to mate with one or more holes formed in the splices 18, 18' based on the desired overall width dimension that is needed. In addition, pins formed on the back of the panel portion 22 of the window cone panel 12 will mate with corresponding holes in the adjacent splice 18, 18', etc. In this manner, window assemblies 10 having customizable overall width dimensions can be quickly and easily constructed to accommodate varying design criteria of aircraft cabins.

The pins 32 function as an assembly aid to line up the component parts with each other. The pins and holes may be dimensioned such that they connect in a snap-fit arrangement wherein the pins will seat within the holes upon the application of a pressing force. In a preferred embodiment, the pins are constructed with a head having a diameter larger than a diameter of a stem portion and the holes are constructed as having a keyhole shape as shown to provide for a secure snap-fit arrangement between adjacent components. Once assembled, glue can be applied across the mated pins/holes to secure the parts together.

The spacing between adjacent pins and holes is dictated by engineering design choice to provide flexibility in tolerance adjustment of pitch. In a preferred embodiment, the separation is 0.125 inch but other distances can be readily realized.

Although the window assembly components are depicted in the figures as either having pins or holes, it will be readily appreciated that any alternative arrangement to releasably secure adjacent components to each other and provide an indexing feature can also be used to accomplish the scope of the invention. For example, a top row of pins can be formed along a top edge of an extender panel and a bottom row of holes can be formed along a bottom edge of the extender panel. Moreover, although four rows of pins/holes are depicted in the figures (see FIGS. 3-4), more or less rows can be provided as dictated by the construction requirements of the overall window assembly.

Turning now to FIGS. 6-9, a double window assembly 10' is shown mounted to an airplane wall section 40 having external windows 44 and a floor section 42. The double window assembly 10' includes two window core panels 12, a double-width shade 70 which will simultaneously regulate the light entering both windows based on an extended or retracted position of a shade fabric across the window openings 24, and a splice component 18 positioned between the window core panels. A right-side and left-side terminator components 16 are provided on each side, respectively, of each window core panel 12 to receive right-side and left-side edges of the double-wide shade assembly. Note that no extender panel(s) 14 is needed in assembly 10'.

Figure 8:
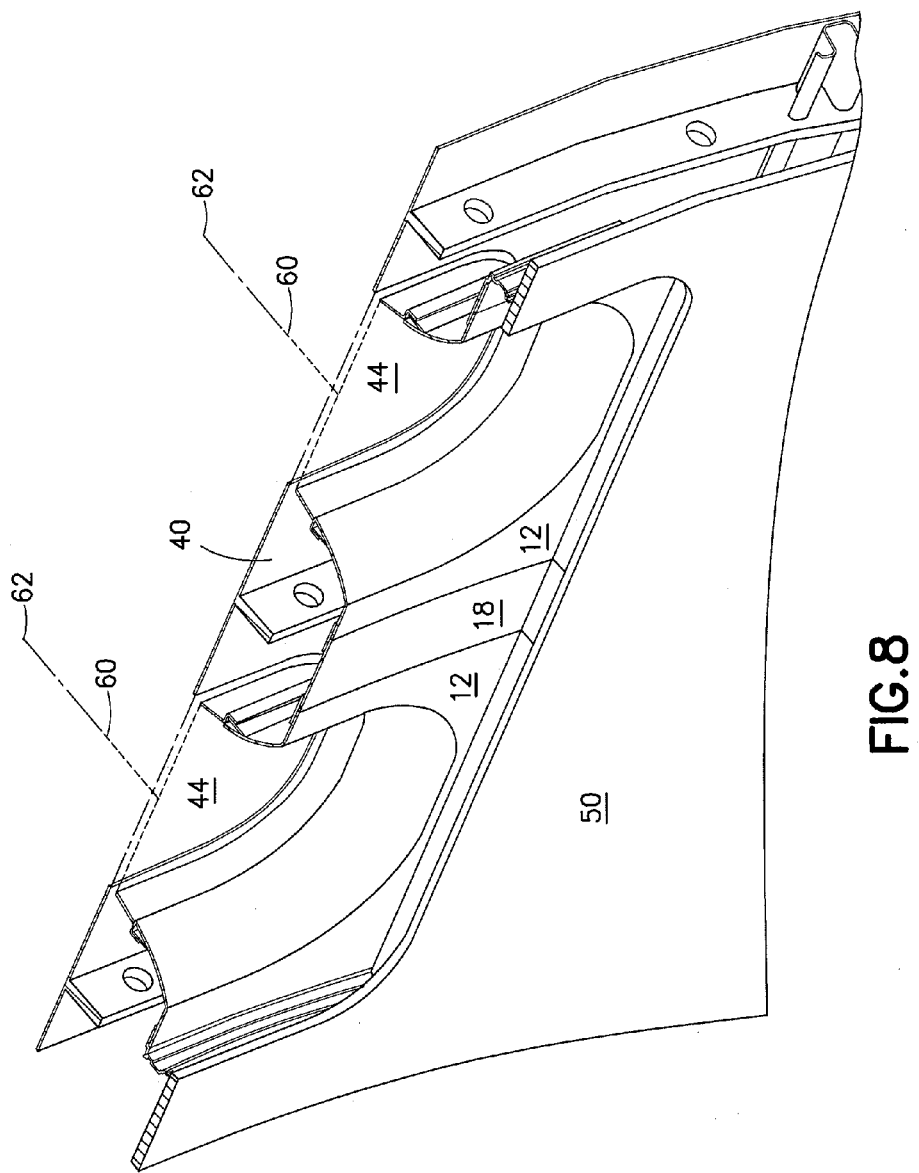
FIG. 8 shows a cross sectional view of the assembly of FIG. 7 taken along the line 8-8.

The window assembly 10' is attached to the wall airplane section 40 at the T-rail mounts 64 of the aircraft via mounting tabs 66 in a known manner and an overlay panel 50 having a double-wide window opening 52 is formed in the panel. When assembled, the window assembly 10' is sandwiched between the airplane wall 40 and the overlay panel and is positioned such that the internal windows 24 are aligned with the external windows 44 such that the center line of the external windows 60 are aligned with the center line of the internal windows 62 (FIG. 8). The indexing thus ensures pitch tolerance and adjustment between adjacent internal windows in an aircraft cabin to align those windows with external windows and with adjacent component parts. Thus, repeatability and alignment among the component parts and the external windows are insured.

What is claimed is:

1. An assembly for an aircraft cabin wall of an aircraft, the aircraft having a fuselage with a plurality of external windows arranged at a pitch; the assembly comprising:
   a plurality of parts, said parts including;
      a window cone panel having an internal window, top and bottom edges defining a panel height, and side edges defining a panel width;
      first and second terminator components disposed on either side of the window cone panel such that the first terminator component is on one side of the window cone panel and the second terminator component is on the other side of the window cone panel; and
      a splice component having top and bottom edges and disposed on either side of the window cone panel between the window cone panel and one of the first and second terminator components;
   wherein the splice component comprises an index for adjusting an overall width of the assembly to align the internal window with the external window pitch.

2. The assembly of claim 1, wherein the first and second terminator components comprise guide rails for engaging a window shade assembly to provide for movement of a shade fabric between the top and bottom edges of the window cone panel.

3. The assembly of claim 1, further comprising an index on the window cone panel and an index on the terminator components, wherein the window cone panel, splice component and terminator components are arranged in an adjacent configuration and the indices of adjacent parts engage.

4. The assembly of claim 3, wherein said window cone panel further comprises an extension region for mounting the window cone panel to the aircraft.

5. The assembly of claim 3, further comprising an extension panel having top and bottom edges defining the panel height, wherein said extension panel comprises an extension panel index for attaching the extension panel to one or more of the terminator component, window panel and splice component.

6. The assembly of claim 3, wherein the window cone panel index is positioned proximate the top and bottom edges.

7. The assembly of claim 3, wherein the indices comprise one of a plurality of pins spaced from each other by a distance, and a plurality of holes spaced from each other by said distance, such that the pins of one part engage the holes of an adjacent part.

8. The assembly of claim 1, wherein the splice component index comprises one of pins and holes arranged in a row parallel to the top and bottom edges of the splice component.

9. The assembly of claim 3, wherein the holes are configured as keyholes and wherein the pins are dimensioned to provide a friction fit connection with the keyholes.

10. The assembly of claim 1, wherein the splice component comprises an upper splice member and a lower splice member.

11. The assembly of claim 1, further comprising an extender panel between the window cone panel and one of the first and second terminator components.

12. The assembly of claim 1, wherein the window cone panel comprises a plurality of internal windows.

13. The assembly of claim 1 wherein the parts are formed by injection molding.

* * * * *